J. KIDD.
Improvement in Apparatus for Generating and Burning Vapors from Hydrocarbons.
No. 4,910. Reissued May 21, 1872.
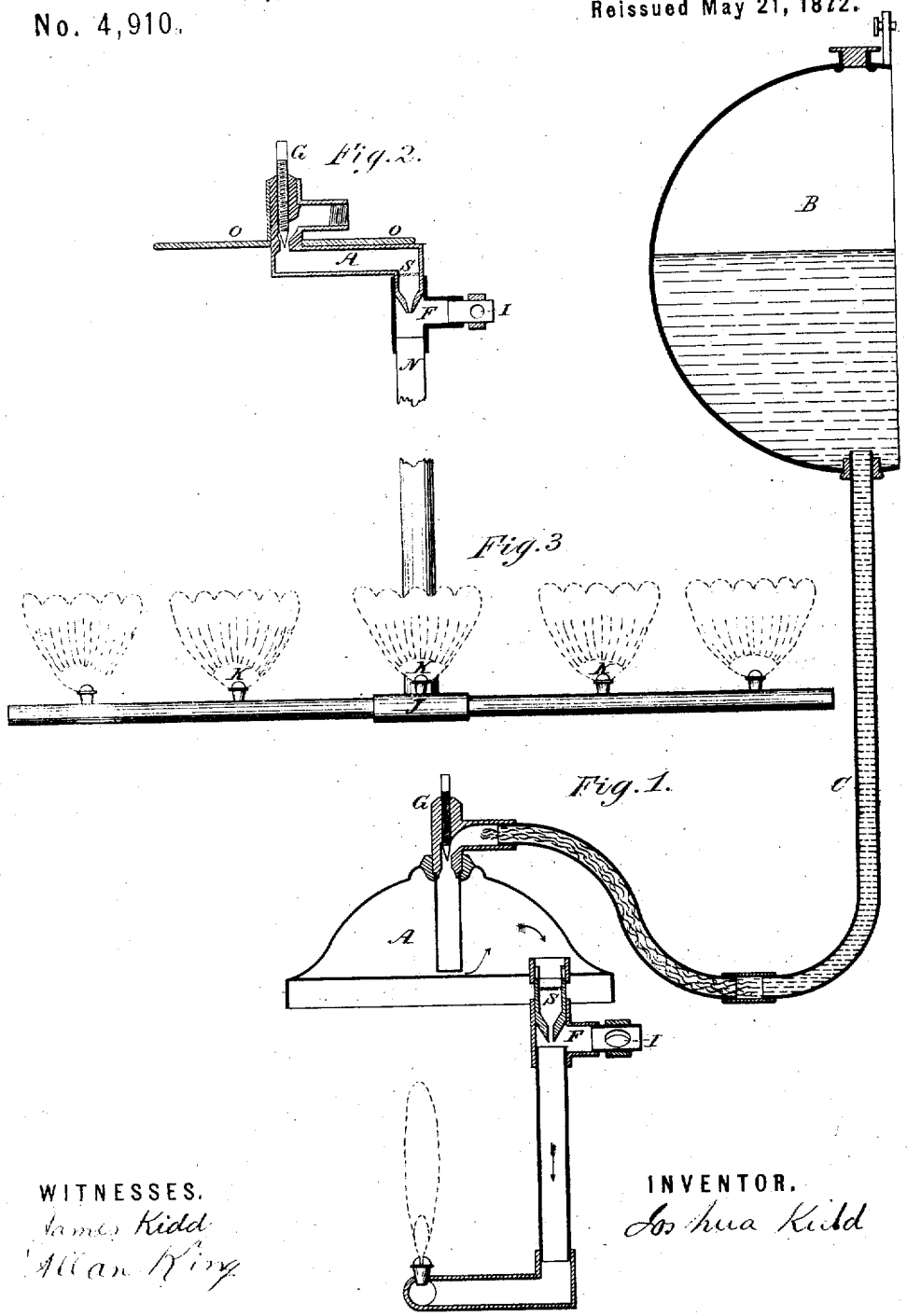
WITNESSES.
James Kidd
Allan King
INVENTOR.
Joshua Kidd

BEST AVAILABLE COPY 4,910

UNITED STATES PATENT OFFICE.

JOSHUA KIDD, OF NEW YORK, N. Y.

IMPROVEMENT IN APPARATUS FOR GENERATING AND BURNING VAPORS FROM HYDROCARBONS.

Specification forming part of Letters Patent No. 110,857, dated January 10, 1871; reissue No. 4,910, dated May 21, 1872.

*To all whom it may concern:*

Be it known that I, JOSHUA KIDD, of the city, county, and State of New York, have invented a new and Improved Apparatus for Generating and Burning the Vapors from Liquid Hydrocarbons; and I do hereby declare that the following is a full, clear, and exact description of the construction and operation of the same, reference being had to the drawing attached and making part of this specification, where similar letters represent similar parts.

Figure 1 represents a vertical section of my improved apparatus, complete. Fig. 2 is a modification of the retort A, shown in Fig. 1. Fig. 3 shows a front elevation of the jets and burner-tube.

My present invention is an improvement on a former invention relating to the same subject, for which Letters Patent were granted to me dated March 9, 1869, No. 87,680; and consists in so arranging the apparatus that either kerosene, naphtha, or gasoline may be used for both lighting and heating purposes.

When my invention is used for heating purposes I allow the vapor to escape from the jet or aperture D against the button H, with a pressure due to a column of liquid, which may vary from twenty to forty inches, as shown in the aforesaid specification. When my invention is used for lighting purposes I combine a device with the vaporizer there shown for mixing air with the vapor by an induced current caused by the escaping force of the vapor. I am aware that the inducing of a current of air by the escaping force of a jet of vapor has been used before in combination with numerous mechanical devices for the utilization of liquid hydrocarbon for lighting and heating purposes.

I lay no claim to the method of inducing a current of air, except when combined with a vaporizer or its equivalent, where the heated oil is injected, under pressure, sparingly, into the aforesaid vaporizer. This retort or vaporizer is heated by the heat given off from the vapor burning under it.

The liquid hydrocarbons most suitable to be used in this apparatus are petroleum, naphtha, or gasoline ranging from 60° to 85° Baumé's scale, but it will also burn kerosene.

*Description of Drawing.*

A shows a section of a round retort or vaporizer. This retort may be made any desired shape, or it may be made of tube bent in a circular, half round, conical, straight, or zigzag form, with or without a metallic heat-conductor, O, attached to it and placed over the flame, as shown at Fig. 2. B is the reservoir; C, the pipe, which may be made from eight inches to five feet in length for conducting the liquid to the vaporizer; G, faucet for regulating and stopping the oil supply; F, small jet for inducing a current of air from the atmosphere, which air is drawn into the tube N at the adjustable opening I; S, wire-gauze to prevent any solid matter from stopping up the jet F; J shows the tube for holding the gas-burners K K for burning the vapor-gas. These burners may be arranged in a variety of forms, and in any number to suit the taste and requirements of parties using the apparatus.

Having now described my invention, I would have it to be understood that I do not confine myself to the exact arrangement shown and described, as the same may be varied; but

What I do claim, is—

1. The combination of vaporizer A, in which vapor is generated by admitting naphtha into the same sparingly, with faucet G, packed tube E, and air-inducing jet F, fixed in a larger pipe open to the atmosphere, or the equivalents of any one or all of said parts, when combined in such a manner that no stop-cock, or its equivalent, intervenes between the jet and the vaporizer.

2. The combination of parts E, A, F, and J, or their equivalents, also the method of placing vaporizer A over or close to the vapor flame so that it can be heated thereby, and fixing inducing-jet F and air-inlet I in any part of the tube conveying the vapor to the burner.

3. The combination of parts A, G, E, and F, or their equivalents, with button H, as described.

JOSHUA KIDD.

Witnesses:
JOHN STEWART,
JAMES KIDD.